Figure 1:
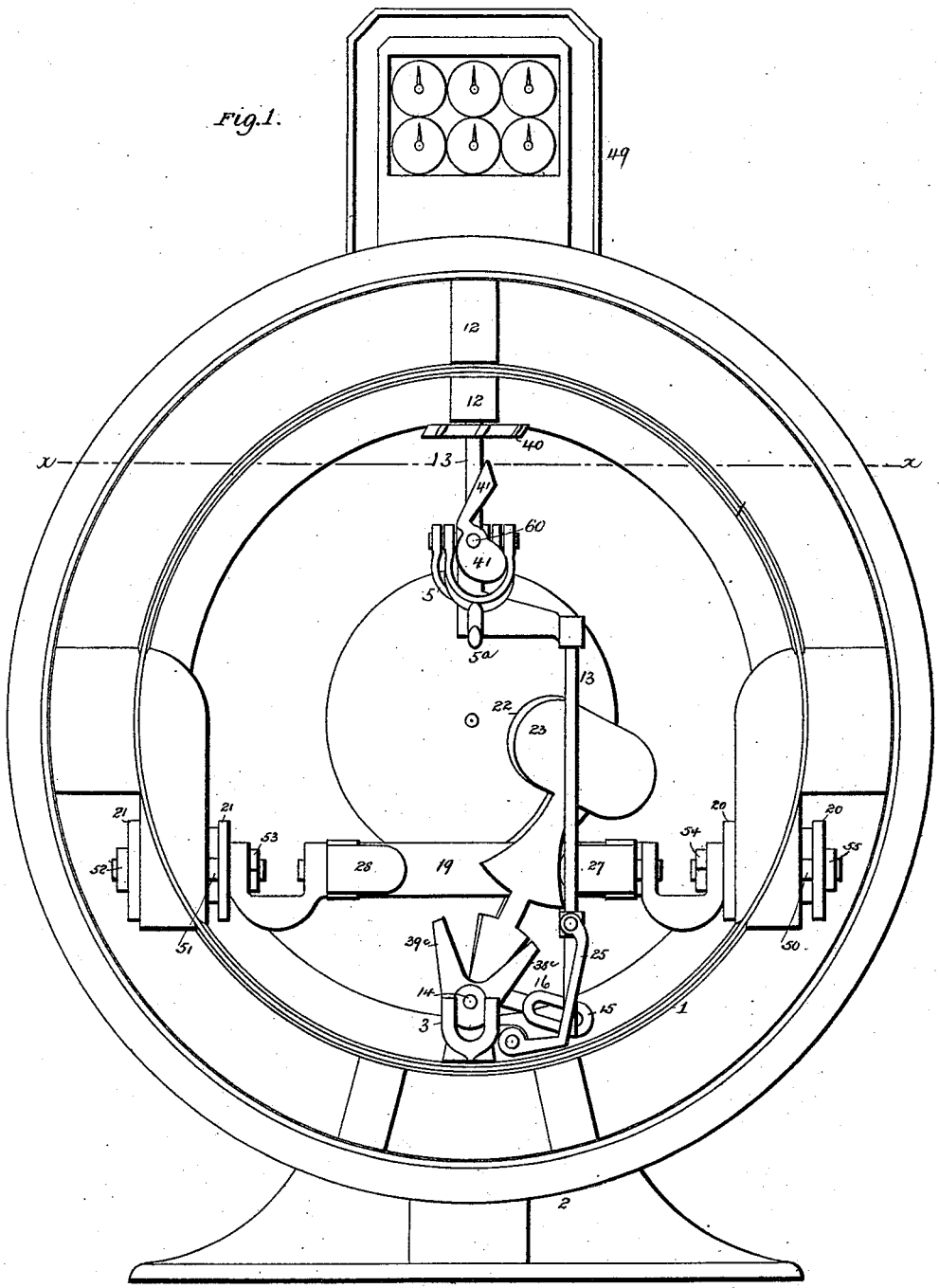

(No Model.) 4 Sheets—Sheet 2.

J. W. CULMER.
GAS METER.

No. 429,424. Patented June 3, 1890.

WITNESSES: INVENTOR

ATTORNEY.

(No Model.) 4 Sheets—Sheet 3.
J. W. CULMER.
GAS METER.

No. 429,424. Patented June 3, 1890.

WITNESSES:
INVENTOR
BY
ATTORNEYS.

(No Model.) 4 Sheets—Sheet 4.
J. W. CULMER.
GAS METER.

No. 429,424. Patented June 3, 1890.

Witnesses: Inventor:

UNITED STATES PATENT OFFICE.

JOHN WOODRUFF CULMER, OF NEW BRIGHTON, PENNSYLVANIA.

GAS-METER.

SPECIFICATION forming part of Letters Patent No. 429,424, dated June 3, 1890.

Application filed December 18, 1889. Serial No. 334,182. (No model.)

*To all whom it may concern:*

Be it known that I, JOHN WOODRUFF CULMER, a citizen of the United States, residing at New Brighton, in the county of Beaver and State of Pennsylvania, have invented new and useful Improvements in Gas-Meters, of which the following is a specification.

My invention relates to that class of gas-meter known as "dry meters," and especially to the construction in which a central ring forms the foundation upon and within which the actuating mechanism is erected, and to which the leather or other material forming with the disks a diaphragm or bellows is attached. In such meters there is formed within such ring and as a portion thereof at certain points, generally diametrically opposite to each other, two chambers having openings in the exterior of the case for the admission and expulsion of the gas being measured. In addition to these exterior openings each chamber has been provided with two ports, which are in their relations to each other and to their respective chambers constructed upon a horizontal line passing through the center of all four ports. A valve-rod has been constructed to pass upon this horizontal line through the centers of all four ports and actuated by mechanism attached to the bellows, and upon such rod there has been fixed a valve for each such port so arranged relatively to each other and to the said ports that when the inner port of the inlet-chamber was closed the outer port of the outlet-chamber should be closed also and the two opposite ports opened. This form of construction requires great accuracy as to the fitting of the several valves upon their respective seats or ports and a further necessity for fitting the valves so that they shall conform to their opposite seats in the opposite chambers, and, as such rods are rigid and such chambers may vary in size, there is a possibility of leakage and irregularity from differences in the expansion of the valve-rod and the central ring with its inlet and outlet chambers.

In the action of meters of this class there is an appreciable moment of time in which during the reversal of the stroke all four ports are unclosed, and this results in the passage of an appreciable percentage of gas through the meter without registering its passage. In this form of meter heretofore the measuring devices have been connected with the registering devices by means of a weighted lever, which, being raised by the outer stroke of the disk forming part of the bellows, returns to its place by gravity upon the return or collapse of the bellows; or such weighted levers have been connected to the disk by means of a loop or link, or a non-weighted lever has been used and its reciprocation effected by means of a spring. In all such cases the motion of the lever has, through the medium of a pawl actuated by said lever and engaged with a ratchet, moved said ratchet forward one or more teeth, and thereby moved the connected registering-train to the extent necessary to register the volume or amount of gas which has passed during the stroke so actuating said lever.

The objections to such constructions are that the lever is liable to become fast at the extremity of the stroke of the bellows and to register nothing thereafter until released; that the pawl may become moved, or the lever bent, and under such conditions the pawl may go on moving indefinitely upon one tooth of the ratchet, the stroke being insufficient to carry said tooth sufficiently far to become engaged with the detent, and that any change in the adjustment whereby the stroke of the bellows is increased or decreased may bring about this result without wear of the pawl.

To provide in such a meter as described a system of such valves whereby the valves controlling the ports in each chamber shall be independent of the valves in the opposite chamber for the purpose of fitting to their seats, and whereby they may be operated in unison or independently, as desired; to provide a means for actuating such valves by which a lead may be given to those of the inlet-chamber to the end that there shall be no time during the stroke when the gas can pass through without registering its passage, and to provide such a meter with a device by which the actuation of the measuring mechanism shall at the same time positively actuate the registering device are the objects of my invention.

Figure 2:
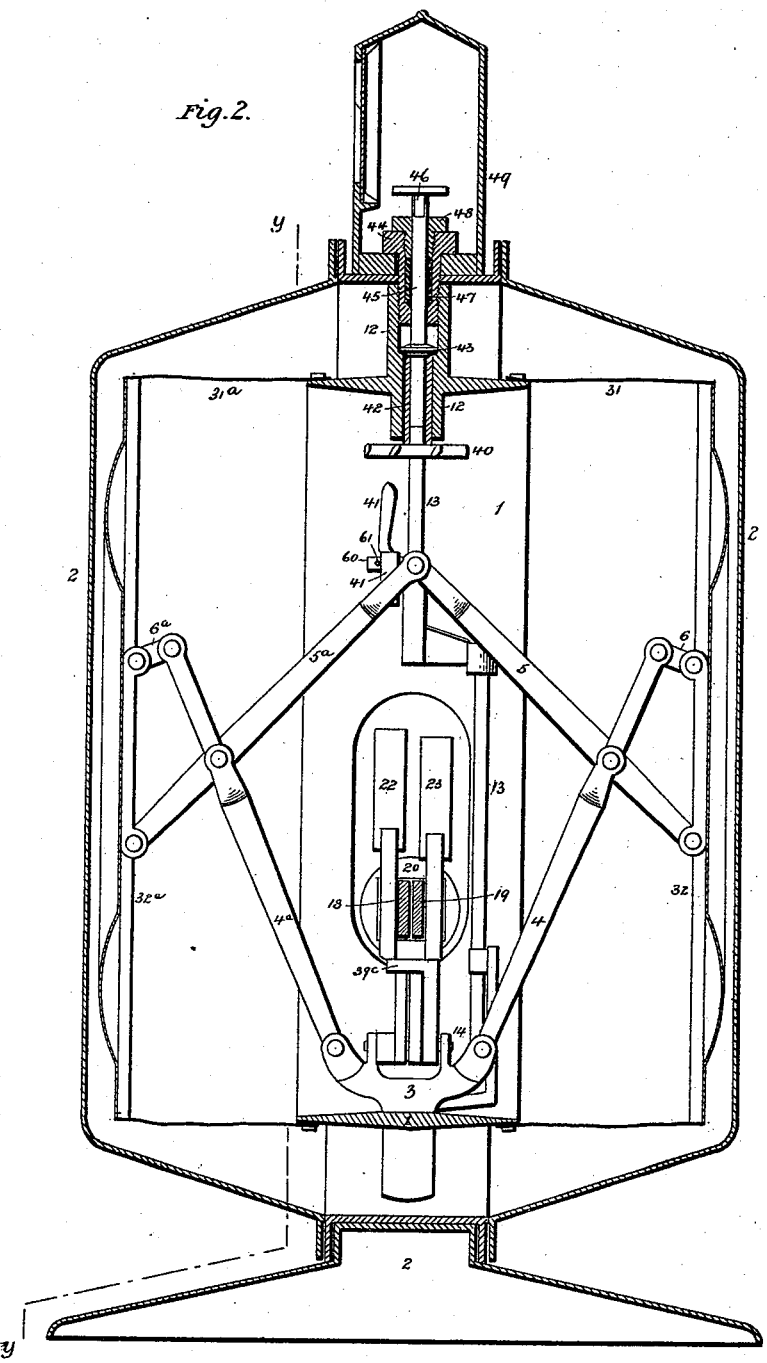
Figure 4:
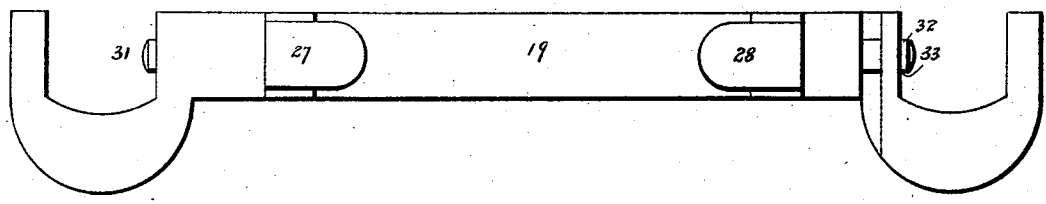
Figure 3:
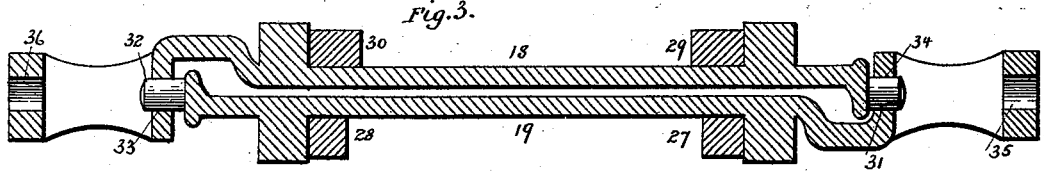
Figure 6:
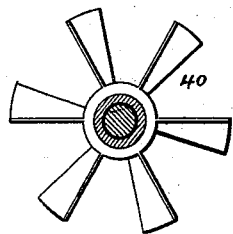
Figure 5:
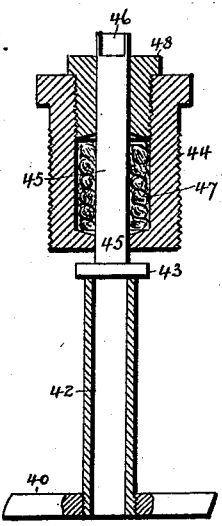
Figure 7:
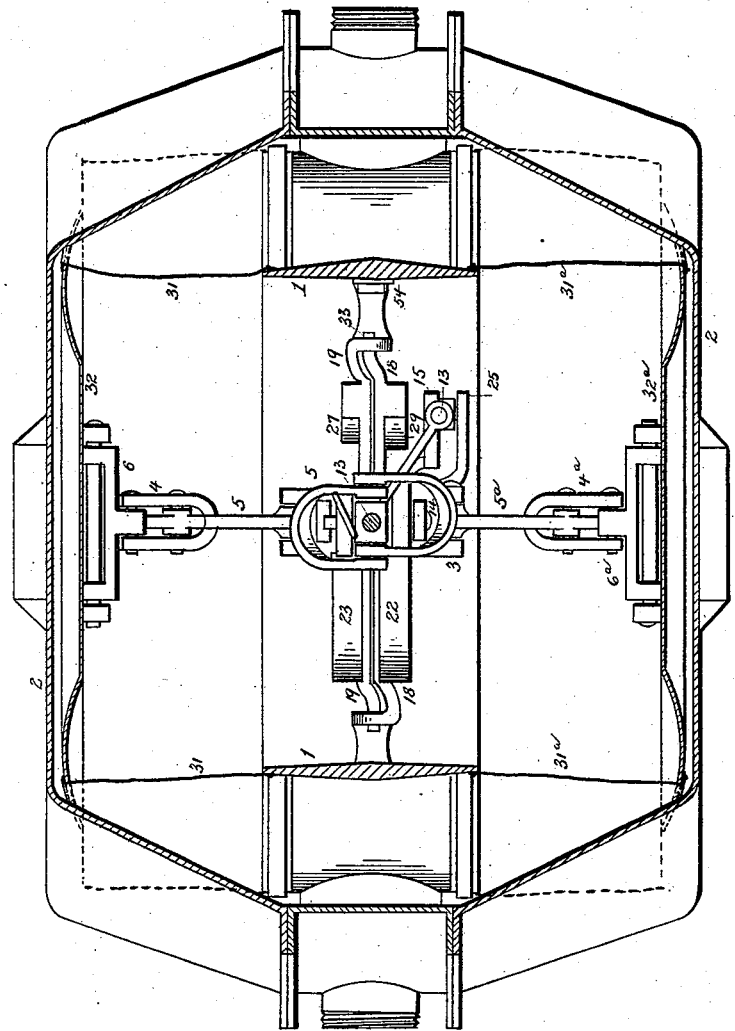

In the accompanying drawings, Figure 1 is a vertical longitudinal section of a meter embodying my improvements. Fig. 2 is a vertical transverse section of the same. Fig. 3 is a horizontal sectional view of a divided valve-rod of my improved form. Fig. 4 is an elevation of the same valve-rod. Fig. 5 is a detached sectional view of the devices constituting a registering attachment. Fig. 6 is a plan view of a propeller-wheel forming part of said registering attachment, and Fig. 7 is a horizontal section taken on the line $x$ $x$ of Fig. 1.

In the form of meter illustrated in the accompanying drawings the meter is constructed and erected of the materials and in the manner described and shown in Letters Patent No. 409,275, granted to me August 20, 1889, with the exceptions hereinafter noted. First, the ring 1 has cast upon it a top projection 12, extending within and without its periphery, and this projection is bored out in a line with the bottom fork 3 for the reception of the tube 42, and is counterbored from the outside to admit the projecting flange 43, which counterbored space is threaded for the reception of the plug 44; second, the connecting-rod 13, which connects the levers 5 $5^a$ and their associated actuating mechanism with the crank 16 of the valve mechanism, is provided with the pin 60, to which is fitted a pawl 41; third, the valve-rod which connects the two pairs of valves 20 20 21 21 is by my improvement divided, the two halves of which being counterparts, and to one half of which one pair of valves are attached, while to the other half the other pair of valves are attached in like manner; fourth, my improvement provides two weighted levers 22 23, each operating upon its individual half of the valve-rod and necessarily upon one pair of valves.

In the erection of the improved meter the tube 42 is fitted with the flange 43 and stem 45 and is threaded upon its opposite end for attachment to the propeller 40. The propeller 40 is constructed with a suitable number of blades or arms extending from its hub, and the hub is threaded for the reception of the tube 42. This tube is passed down through the counterbore in the projection 12 until the flange 43 rests upon the bottom of said counterbore. The propeller is screwed upon the tube from the inside, and the upper end of the connecting-rod 13 is inserted within the tube 42. The pin 60 upon the connecting-rod 13 is fitted with the pawl 41, having a long upper arm for engagement with the arms of the propeller, and its lower part is weighted, so that it may return to a vertical position by force of gravity. The pawl is also provided with suitable stops, and the pin 60 is drilled at 61 for the reception of a key or collar to retain the said pawl in place. The top plug 44 is threaded to screw tightly into the counterbored portion of the projection 12, and is bored through for the admission of the stem 45, and counterbored for the reception of the packing 47, the counterbored portion being threaded for the reception of the follower 48, which is screwed down upon the packing 47, surrounding the stem 45. A register-case 49 is placed upon the top of the meter-case, and the plug 44, being passed through the bottom of such register-case in any suitable way, is held in place by the said plug screwed fast into the projection 12.

The levers 4 $4^a$ are connected to the foot-standard 3 at their lower ends and to the levers 5 $5^a$, which are connected to the connecting-rod 13 at their upper ends and to the spiders $32^a$ at their lower ends, the levers 4 $4^a$ being also connected to said spiders 32 $32^a$ by the short equalizing-levers 6 $6^a$. The connecting-rod 13 is engaged at its lower end with the crank 16, which actuates the weighted lever 22 of the valve system. The valves 20 20 are fitted to the guide 50 and the guide made fast to the half of the divided valve-rod by means of the nut 54, while the other half 19 of said valve-rod is fitted to its bearings with its counterpart by the slipping of the points 31 32 within the openings 33 34, and the valves 21 21 are fitted upon their guide 51 and made fast to their half 19 of the valve-rod by the nut 53. Upon the pivot 14, I mount the two weighted levers 22 23, both being actuated by the arms $38^c$ $39^c$ of the crank 16. The strikes 27 28 and 29 30 are fitted on their respective half of the valve-rod, and by constructing these strikes slightly longer upon the one half of said rod than upon the other half, as both weighted levers 22 23 fall together, that pair of valves which are fitted to that half of the valve-rod having the longer strikes will be moved more quickly than those attached to the other half.

The bellows are attached to the spiders and to the central ring, the case is put in place and made tight, the register-case is screwed down upon the top of said case by means of a plug 44, the packing is inserted within said plug and surrounding the stem 45, and the follower 48 is screwed down, and any approved registering device placed within the said case, and its primary wheel 46 engaged with the stem 45. Gas being admitted to the meter passes outside between the outer case and the bellows and compresses said bellows. The connecting-rod 13 is raised by the levers 5 $5^a$, and the pawl 41, being thus raised and engaging with the propeller 40, rotates it a fraction of a revolution, which fraction registers upon the registering device the unit of volume delivered during the complete stroke of the bellows. At the same time the crank 16 is carried upward by the connecting-rod 13, carrying with it the weighted arms 22 23, and as these arms are brought past the vertical position they fall, and, striking the strikes 27 28 29 30 of the valve-rods 18 19, actuate or reverse the position of the valves and thereby reverse the motion of the bellows.

I claim as my invention—

1. In a gas-meter wherein the valve system is actuated by a connecting-rod reciprocating through its connection with the bellows of said meter, the combination, with such connection-rod, of a pawl attached to said rod and a rotatable propeller-wheel adapted to be engaged by said pawl for operating a registering device, substantially as described.

2. The combination, in a gas-meter, of the chamber-forming case and the central ring having the hollow projection 12, extending on the inner side and on the outer side thereof, and having an interior screw-thread at its upper end with a register-inclosing case, a hollow screw-stud passing through said case into said ring projection, and a register connecting and operating device suspended from said ring projection, for the purpose stated.

3. In a gas-meter, the combination, with an inner ring having a hollow projection, a meter-case, and a register-case, of a register-operating device consisting of a propeller-wheel, a tube to which the propeller is attached, a shouldered or flanged stem forming part of said tube, and a follower for packing said tube within said hollow plug, and means, substantially such as described, for operating said propeller, as described.

4. In a gas-meter having opposite inlet and outlet chambers in which each chamber is provided with two valves which are actuated through the action of a bellows, the combination, with such valves, of a divided valve-rod consisting, essentially, of two counterpart halves 18 19, each attached to and operating its individual pair of valves, as and for the purpose set forth.

5. In a gas-meter, the combination, with the two sets of valves 20 and 21, arranged as described, of a divided valve-rod, each counterpart half of which is connected with its pair of valves, two weighted levers adapted to operate said valve-rods, a crank-arm connected to said weighted levers, the bellows, and intermediate actuating mechanism, substantially as described.

6. In a gas-meter, the combination, with the two sets of valves 20 and 21, arranged as described, of a divided valve-rod composed of counterpart halves, each having strikes, the strikes of one half being longer than those of the other half, two weighted levers, a bellows, and intermediate actuating mechanism whereby one half of said valve-rod is actuated more quickly than the other half, as described.

7. In a gas-meter, the combination, with an inner expansible and collapsible chamber having gas inlets and outlets, valves for said inlets and outlets, and a rod connected to be reciprocated by the expansion and collapse of said chamber and to operate said valve, of a propeller-wheel adapted to operate a registering device and a pawl upon said rod and engaging and revolving said propeller-wheel, substantially as described.

8. In a gas-meter, the combination, with an inner expansible and collapsible chamber having gas inlets and outlets, valves for said inlets and outlets, and a rod for operating said valves and connected to be reciprocated by the expansion and collapse of said chamber, of a tube adapted to actuate a registering device and having the end of said rod sliding within it, a propeller-wheel upon said tube, and a weighted pawl pivoted upon said rod and engaging and revolving said propeller-wheel, substantially as described.

9. In a gas-meter, the combination of an outer casing, a ring supported within said casing, having expansible and collapsible bellows attached to it, and formed with an outwardly-extending hollow projection, a register-case upon the outside of said casing, and a tubular flanged screw-plug inserted through said register-case and outer casing into the end of the projection upon said ring, securing said parts together, substantially as described.

10. In a gas-meter, the combination of an outer casing, a ring within said casing, having expansible and collapsible bellows attached to it, and formed with an outwardly and inwardly extending hollow projection, a register-case upon the outside of said casing, a tubular flanged screw-plug inserted through said case and outer casing into the outer end of said projection, securing said parts together, and a register-operating shaft having a bearing in said plug and projection, substantially as described.

11. In a gas-meter, the combination, with the outer casing 2, the ring 1, having the bellows 31 32 and 31ª 32ª secured to it and formed with the inwardly and outwardly extending projection 12, the register-case 49, and the reciprocating valve-operating rod 13, having the pawl 41 pivoted upon it and connected to said bellows to be reciprocated by them, of the hollow screw-plug 44, securing said register-case, casing, and projection together, the register-operating shaft 45, having the tube 42 upon its lower end and forming a sliding bearing for said rod 13 in said tube, and the propeller 40 upon said tube, engaged and revolved by said pawl, substantially as described.

12. In a gas-meter, the combination, with the outer casing 2, the ring 1, having the bellows 31 32 and 31ª 32ª secured to it and formed with the inwardly and outwardly extending projection 12, having a shoulder in its bore, the register-case 49, and the reciprocating valve-operating rod 13, having the pawl 41 pivoted upon it and connected with said bellows to be reciprocated by them, of the hollow screw-plug 44, inserted through said register-case, casing, and projection, securing them together, the packing in the bore of said plug, the tubular screw-follower in said plug, the register-operating shaft 45, having the tube 42 journaled in said plug, packing, and follower, and formed with the flange 43, seated upon the shoulder in the bore of said plug, and the propeller 40 upon said tube, engaged and revolved by said pawl, substantially as described.

13. In a gas-meter, the combination, with an outer casing and inner expansible and collapsible chamber and diametrically-opposite inlet and outlet chambers having opposite valve-openings communicating with said casing and chambers, of two pairs of connected valves seated upon said openings, two parallel rods secured at their opposite ends to said valves, connected to have a slight longitudinal play one upon the other, and formed with longer shoulders or "strikes" upon one rod and shorter shoulders or strikes upon the other rod, and two weighted and pivoted levers rocking at the sides of said rods to strike said shoulders, and connected to the walls of said expansible and collapsible chamber to be rocked by their movements, substantially as described.

14. In a gas-meter, the combination, with the outer casing 2, the inner casing 1, having the expansible and collapsible walls, and the diametrically-opposite inlet and outlet chambers having the opposite valve-openings communicating with said casing and chamber, of the connected valves 20 20 and 21 21 for said openings, the rods 18 and 19, respectively secured to said valves, having the ends 31 and 32 sliding in the bores 33 and 34, and provided with the longer shoulders 29 30 upon one rod and the shorter shoulders 27 28 upon the other rod, the pivoted weighted levers 22 23, and the crank 16, connected to be rocked by the expansion and collapse of said chamber pivoted concentric with said levers and provided with the arms 38$^c$ 39$^c$, engaging said levers, substantially as described.

In testimony whereof I have hereunto set my hand in the presence of two subscribing witnesses.

JOHN WOODRUFF CULMER.

Witnesses:
  A. E. H. JOHNSON,
  E. M. DAWSON.